US012342221B2

(12) United States Patent
Sun et al.

(10) Patent No.: US 12,342,221 B2
(45) Date of Patent: Jun. 24, 2025

(54) MULTI-BASE STATION QUEUED PREAMBLES ALLOCATION METHOD BASED ON COLLABORATION BETWEEN MULTIPLE AGENT

(71) Applicant: Nanjing University Of Posts And Telecommunications, Jiangsu (CN)

(72) Inventors: Jun Sun, Jiangsu (CN); Mengzhu Guo, Jiangsu (CN); Yin Lu, Jiangsu (CN)

(73) Assignee: Nanjing University Of Posts And Telecommunications, Jiangsu (CN)

( * ) Notice: Subject to any disclaimer, the term of this patent is extended or adjusted under 35 U.S.C. 154(b) by 0 days.

(21) Appl. No.: 18/031,866

(22) PCT Filed: Jul. 22, 2022

(86) PCT No.: PCT/CN2022/107420
§ 371 (c)(1),
(2) Date: Apr. 13, 2023

(87) PCT Pub. No.: WO2023/226183
PCT Pub. Date: Nov. 30, 2023

(65) Prior Publication Data
US 2025/0088909 A1    Mar. 13, 2025

(30) Foreign Application Priority Data
May 24, 2022    (CN) .......................... 202210570855.2

(51) Int. Cl.
*H04W 28/08* (2023.01)
*H04W 28/086* (2023.01)

(52) U.S. Cl.
CPC ... *H04W 28/0975* (2020.05); *H04W 28/0861* (2023.05)

(58) Field of Classification Search
CPC ......... H04W 28/0975; H04W 28/0861; H04W 36/00725; H04W 74/0833; H04W 74/0838
See application file for complete search history.

(56) References Cited

U.S. PATENT DOCUMENTS

| 2018/0199251 A1* | 7/2018 | Kim ................. H04W 36/0066 |
| 2019/0246428 A1* | 8/2019 | Yoon ..................... H04W 16/14 |

(Continued)

FOREIGN PATENT DOCUMENTS

| CN | 112465151 | 3/2021 |
| CN | 113114581 | 7/2021 |

OTHER PUBLICATIONS

Zhou Zhenyu et al., "Context-aware learning-based access control method for power IoT", Journal on Communications, Mar. 2021, pp. 1-10.

(Continued)

*Primary Examiner* — Mehmood B. Khan
(74) *Attorney, Agent, or Firm* — JCIPRNET

(57) ABSTRACT

Disclosed is a multi-base station queued preambles allocation method based on collaboration between multiple agent, which provides a non-competitive preambles allocation method in a scenario of multiple base stations and multiple cells, so as to solve the congestion problem caused during random access of massive MTCDs. The devices are queued to select the preambles based on deep reinforcement learning, and a training method based on federal learning is applied, thus effectively solving the congestion problem caused by competitive access. First, the newly accessed devices are grouped and the level of priority is set according to a delay tolerance time. Then, the device are reasonably allocated to idle queues by means of a multi-agent reinforcement learning algorithm. Finally, by means of a federal training method, the neural network of each agent is syn- (Continued)

chronously optimized by means of average optimization of neural network gradients, thus completing preambles allocation to each agent.

6 Claims, 2 Drawing Sheets

(56) References Cited

U.S. PATENT DOCUMENTS

| | | | |
|---|---|---|---|
| 2021/0014900 A1* | 1/2021 | Lei | H04W 52/42 |
| 2021/0150417 A1 | 5/2021 | Fadel Argerich et al. | |
| 2023/0217306 A1* | 7/2023 | Kim | H04W 28/06 370/329 |

OTHER PUBLICATIONS

"International Search Report (Form PCT/ISA/210) of PCT/CN2022/107420," mailed on Nov. 28, 2022, pp. 1-4.
"Written Opinion of the International Searching Authority (Form PCT/ISA/237) of PCT/CN2022/107420," mailed on Nov. 28, 2022, pp. 1-3.

* cited by examiner

MULTI-BASE STATION QUEUED PREAMBLES ALLOCATION METHOD BASED ON COLLABORATION BETWEEN MULTIPLE AGENT

CROSS-REFERENCE TO RELATED APPLICATION

This application is a 371 of international application of PCT application serial no. PCT/CN2022/107420, filed on Jul. 22, 2022, which claims the priority benefit of China application serial no. 202210570855.2, filed on May 24, 2022. The entirety of each of the above-mentioned patent applications is hereby incorporated by reference herein and made a part of this specification.

TECHNICAL FIELD

The present disclosure relates to the technical field of wireless communications, and in particular, to a preambles allocation method during random access of massive Machine Type Communication (mMTC) devices in Internet of Things (IoT).

BACKGROUND

Massive machine type communication is one of the three major application scenarios of the fifth-generation mobile communication technology. Machine Type Communication (MTC) is a key technology in the fifth-generation new radio (5GNR) and plays a huge role in important and critical application scenarios such as telemedicine, autonomous driving, intelligent transportation, and the like. MTC is also referred to as Machine to Machine (M2M) communication. Different from human to human (H2H) communication, the M2M communication occurs mainly in the uplink, with a large number of terminals, short duration, and frequent occurrence. In the conventional access manner, MTC devices always choose an evolved Node B with the best signal quality for access. Thus, a large number of Machine Type Communication devices (MTCDs) collide, causing network congestion and seriously affecting the access success rate of the devices. Therefore, how to design a reasonable scheme for random access of massive MTCDs becomes the key to a 5G mobile communication system. The most promising solution is to formulate a set of preamble allocation schemes by means of reinforcement learning, which let the devices make the decision to choose an appropriate preamble to minimize the conflict that occurs during random access. In these schemes, the devices compete with each other for the preamble, and as the number of devices increases, the conflict is unavoidable and the access success rate becomes increasingly low. Therefore, it is necessary to formulate a reasonable preamble allocation scheme to reduce or even avoid the conflict during the random access of massive MTCDs.

SUMMARY

Invention objective: The present disclosure aims to provide a multi-base station queued preamble allocation method based on collaboration between multiple agent, which provides a non-competitive preamble allocation method in a scenario of multiple base stations and multiple cells, so as to solve the congestion problem caused during random access of massive MTCDs.

To achieve the foregoing function, the present disclosure designs a multi-base station queued preamble allocation method based on collaboration between multiple agent, where a target area includes a network composed of at least two base stations and each base station includes a preambles pool; and for each agent that accesses the network, the following steps S1 to S3 are performed so as to complete preambles allocation to each agent:

S1. grouping the agent that access the network according to a service type of each agent, calculating an average delay tolerance for each group of agent, and arranging the average delay tolerances of all the groups of agent in an ascending order, to obtain a priority set;

S2. for each group of agent, conducting preambles allocation to each agent in each group based on a reinforcement learning algorithm;

where each preamble corresponds to a queue; a status space S is established based on the maximum queuing number in each queue and an action space A is established based on an action of the agent selecting a preambles for queuing; with the status space S as an input, by means of a deep neural network and a Q-learning method, the agent selects an action in the action space A as an action executable by the agent based on a greedy strategy and with the goal of benefit maximization; and with a Q-value of the action executable by the agent as an output, a local agent preambles allocation model is established;

S3. establishing a global agent preambles allocation model based on the local agent preambles allocation model corresponding to each agent and a federal agent, and training the global agent preambles allocation model by means of a federal learning method, to obtain a trained global agent preambles allocation model; and completing preambles allocation to each agent that accesses the network by applying the global agent preambles allocation model.

As a preferred technical solution of the present disclosure, specific steps of grouping the agent that access the network according to a service type, calculating an average delay tolerance for each group of agent, and arranging the average delay tolerances of all the groups of agent in an ascending order, to obtain a priority set in step S1 are as follows:

S11: according to a delay requirement for the service of each agent, calculating a degree of service similarity between the agent by the following formula:

$$c(i,j) = e^{\frac{(t_i - t_j)^2}{2\sigma^2}}$$

where $c(i,j)$ is a degree of similarity between services i and j, $t_i$ is a delay requirement for the service i, $t_j$ is a delay requirement for the service j, and $\sigma$ is a similarity coefficient and $0 \leq c(i,j) \leq 1$; and according to the degree of service similarity between the agent, taking services of the agent that have a similarity difference less than a preset value as services of the same type and grouping the corresponding agent into the same group;

S12: for each group of agent, calculating the average delay tolerance by the following formula:

$$\bar{t}_k = \frac{\sum_{i=1}^{N_k} t_i}{N_k}$$

where $N_k$ indicates the number of agent in the k-th group, and $\bar{t}_k$ indicates an average delay tolerance of the k-th agent group; and S13: respectively calculating an average delay tolerance of each group of agent, denoted as $\{\bar{t}_1, \bar{t}_2, \bar{t}_3, \ldots, \bar{t}_n\}$, where n is the number of the agent groups; and then arranging the calculated average delay tolerances of these agent groups in an ascending order and assigning the level of priority thereto successively, where the priority order is assigning the highest level of priority to an agent group with the minimum average delay tolerance and the lowest level of priority to an agent group with the maximum average delay tolerance, to obtain a priority set consisting of the levels of priority of these agent groups.

As a preferred technical solution of the present disclosure, specific steps of step S2 are as follows:

S21: with each preamble corresponding to a queue, establishing a status as the following equation based on the maximum queuing number in each queue at the time t:

$$s_t = \{p^1, p^2, \ldots, p^i, \ldots, p^M\}.$$

where $s_t$ is a status at the time t, $p^i$ is the maximum queuing number in the i-th queue, $i \in \{1,2,\ldots,M\}$, and M is a total number of the queues;

establishing a status space S from an initial time to the time t as the following equation:

$$S = \{s_0, s_1, \ldots, s_t\}$$

where $s_0, s_1, \ldots, s_t$ indicate statuses from the initial time to the time t, and $s_0$ is a status at the initial time;

S22: when accessing the network, the agent selecting one of queues corresponding to the M preamble and queuing up therein, and establishing an action space A as the following equation based on the action of the agent selecting a preamble for queueing:

$$A = \{a^1, a^2, \ldots, a^i, \ldots, a^M\}$$

where $a^i$ indicates an action strategy of the agent, namely, an action of selecting the i-th preamble for queuing;

S23: respectively assigning rewards $r^1, r^2 \ldots, r^n$ to action strategies $a^1, a^2 \ldots, a^n$ selected and executed by the agent, and establishing a reward function R as the following equation:

$$R = r^i(r^1, r^2, r^3, \ldots, r^n)$$

by introducing the levels of priority of the agent and the variance of each queue, transforming the reward function R into the following form:

$$r^i(r^1, r^2, \ldots, r^n) = \sum_{i=1}^{n} f^i(a^1, a^2, \ldots, a^n) - \sum_{i=1}^{n} g^i(a^1, a^2, \ldots, a^n)$$

where $f^i(a^1, a^2, \ldots, a^n)$ indicates the level of priority of an agent i, and $g^i(a^1, a^2, \ldots, a^n)$ indicates the variance of the queue;

S24: by means of the deep neural network and a Q-learning method, establishing a local agent preambles allocation model, which uses the status space S as the input and Q-values of actions executable by the agent as the output, where each action of the agent in a status $s_t$ corresponds to the Q-value $Q(s_t, a_t)$, at being as follows:

$$a_t = \arg\max_{a \in A} Q(s_t, a)$$

where a indicates all the executable actions in the status $s_t$; according to the Q-learning algorithm, updating the Q-value $Q_{k+1}(s_t, a_t)$ at the next time by using the following formula:

$$Q_{k+1}(s_t, a_t) = Q_k(s_t, a_t) + \alpha_k \cdot \left[ r_{t+1} + \gamma \cdot \max_{a' \in A} Q_k(s_{t+1}, a') - Q_k(s_t, a_t) \right]$$

where $a_k$ and $\gamma$ are respectively a learning rate and a discount factor, $s_{t+1}$ indicates a status at the next time, $r_{t+1}$ indicates a received reward corresponding to an action executable by the agent in the status $s_{t+1}$, a' indicates the action executable by the agent in the status $s_{t+1}$, A is the action space, $Q_k(s_t, a_t)$ indicates a Q-value in the status $s_t$, and $$\max_{a' \in A} Q_k(s_{t+1}, a')$$

indicates the maximum Q-value corresponding to each executable action in the action space A in the status $s_{t+1}$;

S25: updating the status $s_{t+1}$ and the corresponding reward $r_{t+1}$, and establishing training samples $(s_t, a_t, s_{t+1}, r_{t+1})$ and storing them in an experience replay database;

S26: a loss function $L_i(\theta)$ of each agent being as follows:

$$L_i(\theta) = E\left[\left(y^{DQN} - Q_k(s_t, a_t; \theta)\right)^2\right]$$

where $\theta$ indicates the weight of an online network; and $y^{DQN}$ is calculated by the following formula:

$$y^{DQN} = r_{t+1} + \gamma \max_{a' \in A} Q_i(s', a_i'; \theta^-)$$

where $a_i'$ indicates an action that maximizes the Q-value of the target network in the status s', and $\theta^-$ indicates the weight; and S27: randomly selecting the training samples in the experience replay database to train the local agent preambles allocation model.

As a preferred technical solution of the present disclosure, the status is updated after the local agent preambles allocation model is trained for preset times in step S2.

As a preferred technical solution of the present disclosure, in step S2, each agent uses ε-greedy strategies to select an action $a_i$, selects an action strategy in the action space A with the probability of an exploration factor ε, and selects an optimal action strategy in the action space A with the probability of (1−ε).

As a preferred technical solution of the present disclosure, specific steps of training the global agent preambles allocation model by means of a federal learning method in step S3 are as follows:

S31: all of the agents choosing an action strategy according to a current status and acquiring a corresponding reward;

S32: each agent inputting the current status into a deep neural network in its own local agent preambles allocation model for learning, to obtain parameters of each local agent preambles allocation model; and sending the parameters to the federal agent; and S33: the federal agent learning the parameters of each local agent preambles allocation model by means of a federated average algorithm, to obtain a global agent preambles allocation model, where parameters of the global agent preambles allocation model are as follows:

$$\theta_g = \sum_{k=1}^{N} \frac{D_k}{D} \theta_l$$

where $\theta_g$ is the weight of the global agent preambles allocation model, $\theta_l$ is the weight of the local agent preambles allocation model, D is the amount of training data, and $D_k$ indicates the amount of data possessed by the k-th participant.

DETAILED DESCRIPTION OF THE EMBODIMENTS

The present disclosure is further described below with reference to the accompanying drawings. The following embodiments are only used to clearly illustrate the technical solution of the present disclosure, and not intended to limit the protection scope of the present disclosure.

An embodiment of the present disclosure provides a multi-base station queued preambles allocation method based on collaboration between multiple agent, where a target area includes a network composed of at least two base stations and each base station includes a preambles pool. For each agent that accesses the network, the following steps S1 to S3 are performed so as to complete preambles allocation to each agent.

Figure 1:
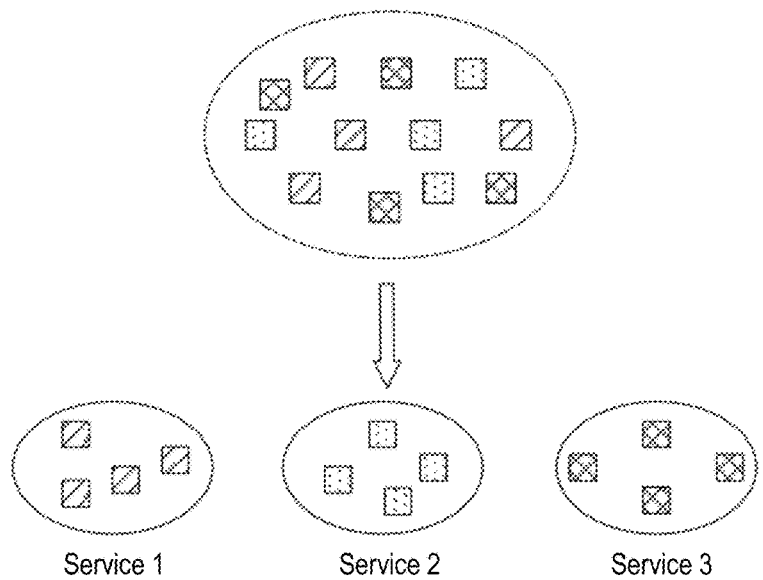
FIG. 1 is a schematic diagram of grouping of agent according to an embodiment of the present disclosure.

S1. The agent are MTC devices each having its own service type. The agent that access the network are grouped according to the service type of each agent, and an average delay tolerance is calculated for each group of agent and the average delay tolerances of all the groups of agent are arranged in an ascending order, to obtain a priority set. A schematic diagram of grouping of the agent is shown in FIG. 1.

Specific steps of step S1 are as follows:

S11: Different service types exist in the network, and the services are classified into delay-tolerant services and delay-sensitive services according to the varying sensitivity of these service types to the delay. In addition, a QoS requirement of each agent further needs to be considered. Because there are a large number of agent that simultaneously access the network, the service types accessed at the same time are also different. According to current network requirements for the MTC applications, the relevance between the service types is measured by means of a delay requirement for each service type; and according to the delay requirement for the service of each agent, a degree of service similarity between the agent is calculated by the following formula:

$$c(i, j) = e^{\frac{(t_i - t_j)^2}{2\sigma^2}}$$

where c(i,j) is a degree of similarity between services i and j, $t_i$ is a delay requirement for the service i, $t_j$ is a delay requirement for the service j, and σ is a similarity coefficient and 0≤c(i,j)≤1, a greater c(i,j) indicating that the two services are more similar.

According to the degree of service similarity between the agent, services of the agent that have a similarity difference less than a preset value are taken as services of the same type and the corresponding agent are grouped into the same group.

S12: For each group of agent, the average delay tolerance is calculated by the following formula:

$$\overline{t_k} = \frac{\sum_{i=1}^{N_k} t_i}{N_k}$$

where $N_k$ indicates the number of agent in the k-th group, and $\overline{t_k}$ indicates an average delay tolerance of the k-th agent group.

S13: An average delay tolerance of each group of agent is respectively calculated and is denoted as $\{\overline{t_1}, \overline{t_2}, \overline{t_3}, \ldots, \overline{t_n}\}$, where n is the number of the agent groups; and then the calculated average delay tolerances of these agent groups are arranged in an ascending order and the level of priority is assigned thereto successively, where the priority order is assigning the highest level of priority to an agent group with the minimum average delay tolerance and the lowest level of priority to an agent group with the maximum average delay tolerance, to obtain a priority set consisting of the levels of priority of these agent groups.

S2. For each group of agent, preambles allocation to each agent in each group is conducted based on a reinforcement learning algorithm; and by the idea of reinforcement learning, the agent continuously interacts with the network and then selects an action that can maximize the benefit based on the network.

Reinforcement learning is used for solving the problem in the Markova decision process. In reinforcement learning, the agent can periodically learn and take actions, observe the maximum benefit and automatically adjust an action strategy, so as to obtain an optimal action strategy. Because the agent is grouped, the multiple agent learn in an interaction process with the network. In the case of competitive games, the multiple agent can achieve local optimum, but cannot realize the maximization of overall network performance. In order to achieve the goal of optimizing the problem, the problem of the multiple agent is transformed into a cooperative game, and the same reward function is used for all the agent.

Figure 2:
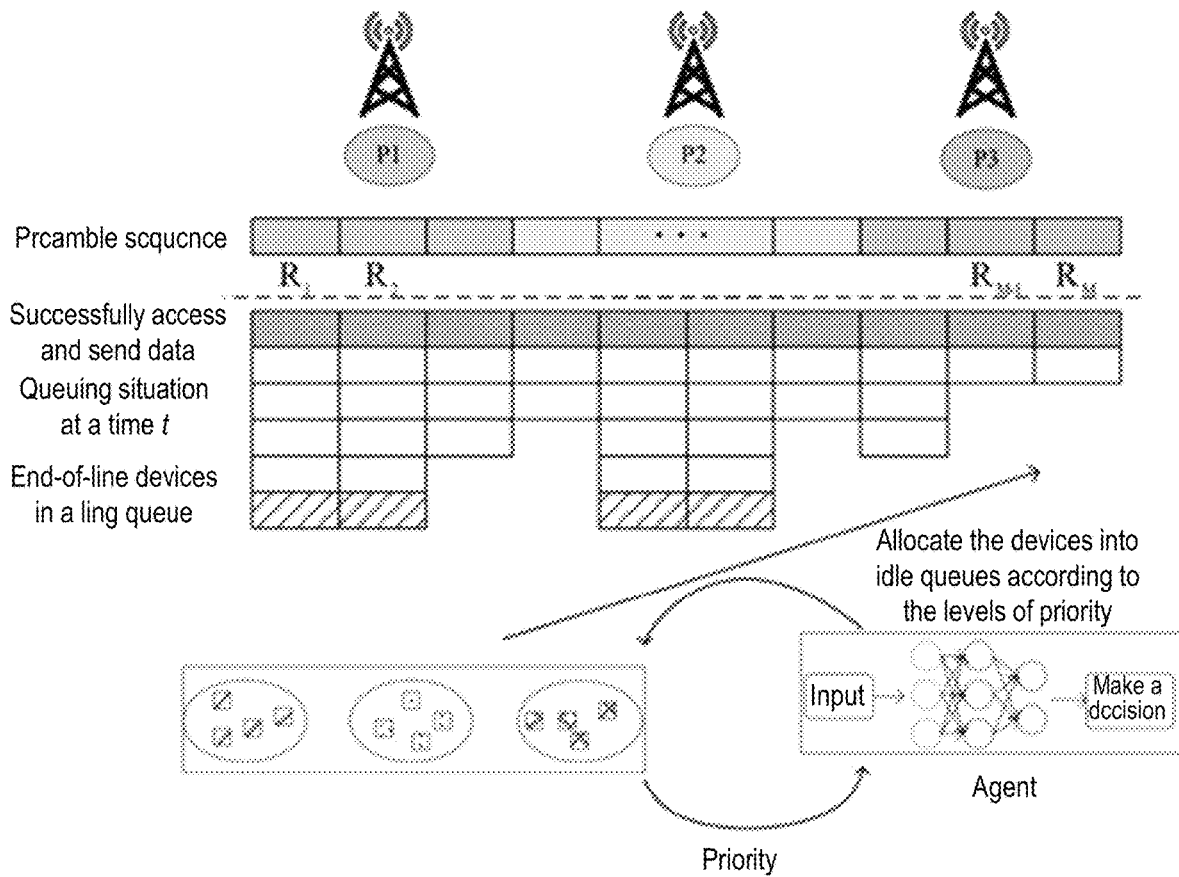
FIG. 2 is a schematic diagram of agent accessing a network according to an embodiment of the present disclosure.

Each preamble corresponds to a queue. A status space S is established based on the maximum queuing number in each queue and an action space A is established based on an action of the agent selecting a preamble for queuing. with the status space S as an input, by means of a deep neural network and a Q-learning method, the agent selects an action in the action space A as an action executable by the agent based on a greedy strategy and with the goal of benefit maximization. With a Q-value of the action executable by the agent as an output, a local agent preambles allocation model is established. A schematic diagram of the agent accessing the network is shown in FIG. 2, where $R_1$, $R_2$, ..., $R_{M-1}$, $R_M$ indicate the preambles.

Specific steps of step S2 are as follows:

S21: Each preamble corresponds to a queue, and a status is established as the following equation based on the maximum queuing number in each queue at the time t:

$$s_t = \{p^1, p^2, ..., p^i, ..., p^M\}.$$

where $s_t$ is a status at the time t, $p^i$ is the maximum queuing number in the i-th queue, $i \in \{1, 2, ..., M\}$ and M is a total number of the queues.

A status space S from an initial time to the time t is established as the following equation:

$$S = \{s_0, s_1, ..., s_t\}$$

where $s_0, s_1, ..., s_t$ indicate statuses from the initial time to the time t, and $s_0$ is a status at the initial time.

S22: When accessing the network, the agent selects one of queues corresponding to the M preamble sand queues up therein. An action space A is established as the following equation based on the action of the agent selecting a preamble for queueing:

$$A = \{a^1, a^2, ..., a^i, ..., a^M\}$$

where $a^i$ indicates an action strategy of the agent, namely, an action of selecting the i-th preamble for queuing.

S23: Rewards $r^1, r^2, ..., r^n$ are respectively assigned to action strategies $a^1, a^2, ..., a^n$ selected and executed by the agent, and a reward function R is established as the following equation:

$$R = r^i(r^1, r^2, r^3, ..., r^n)$$

When the number of agent queuing up in each queue tends to be equal, there is no idle queue at this time and thus there is no idle preambles, and the access efficiency is higher at this time. When there are a large number of agent, higher-priority agent get into the queues faster, and the access success rate of the agent can be guaranteed in the case of access within a delay tolerance time.

By introducing the levels of priority of the agent and the variance of each queue, the reward function R is transformed into the following form:

$$r^i(r^1, r^2, ..., r^n) = \sum_{i=1}^{n} f^i(a^1 a^2, ..., a^n) - \sum_{i=1}^{n} g^i(a^1, a^2, ..., a^n)$$

where $f^i(a^1, a^2, ..., a^n)$ indicates the level of priority of an agent i, and the highest-priority agent gets the greatest reward when entering the queue; and $g^i(a^1, a^2, ..., a^n)$ indicates the variance of the queue.

Figure 3:
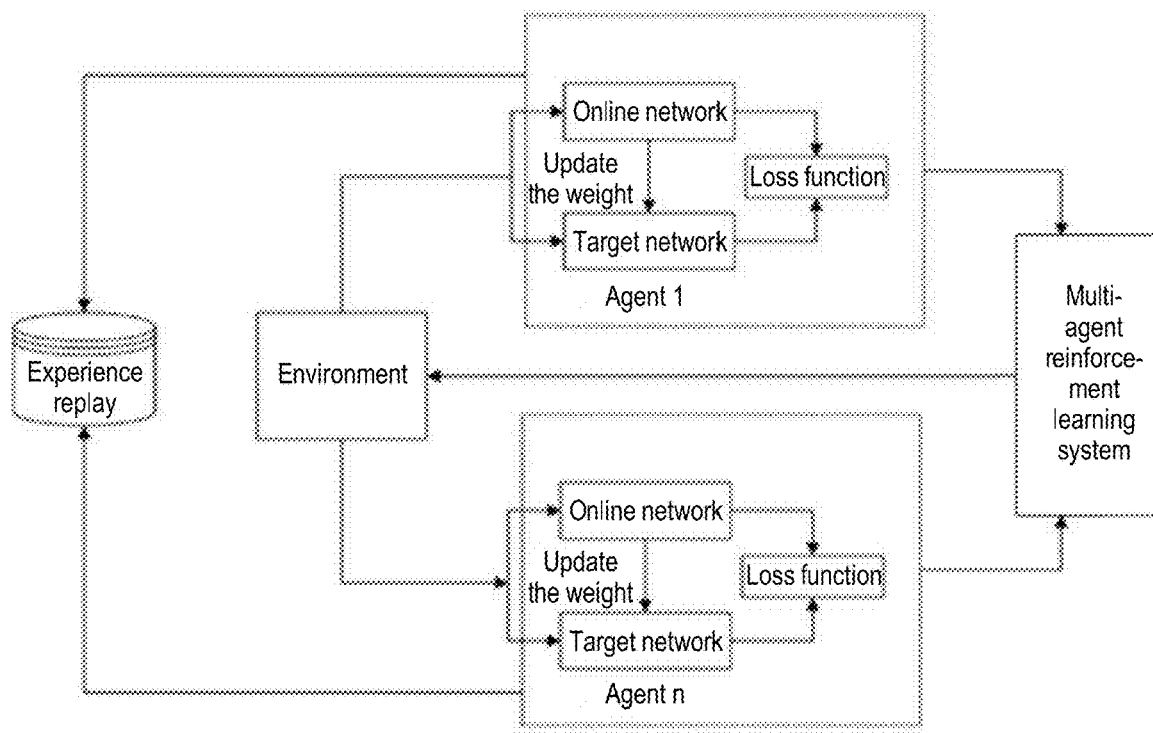
FIG. 3 is a structural diagram of a neural network of agent according to an embodiment of the present disclosure.

S24: By means of the deep neural network and a Q-learning method, a local agent preambles allocation model is established, which uses the status space S as the input and Q-values of actions executable by the agent as the output. A structural diagram of a neural network of the agent is shown in FIG. 3, where each action of the agent in a status $s_t$ corresponds to the Q-value $Q(s_t, a_t)$, $a_t$ being as follows:

$$a_t = \arg\max_{a \in A} Q(s_t, a)$$

where a indicates all the executable actions in the status $s_t$.

According to the Q-learning algorithm, the Q-value $Q_{k+1}(s_t, a_t)$ at the next time is updated by using the following formula:

$$Q_{k+1}(s_t, a_t) = Q_k(s_t, a_t) + \alpha_k \cdot \left[r_{t+1} + \gamma \cdot \max_{a' \in A} Q_k(s_{t+1}, a') - Q_k(s_t, a_t)\right]$$

where $a_k$ and y are respectively a learning rate and a discount factor, $s_{t+1}$ indicates a status at the next time, $r_{t+1}$ indicates a received reward corresponding to an action executable by the agent in the status $s_{t+1}$, a' indicates the action executable by the agent in the status $s_{t+1}$, A is the action space, $Q_k(s_t, a_t)$ indicates a Q-value in the status $s_t$, and $$\max_{a' \in A} Q_k(s_{t+1}, a')$$

indicates the maximum Q-value corresponding to each executable action in the action space A in the status $s_{t+1}$.

S25: The status $s_{t+1}$ and the corresponding reward $r_{t+1}$ are updated, and training samples $(s_t, a_t, s_{t+1}, r_{t+1})$ are established and stored in an experience replay database.

S26: A loss function $L_i(\theta)$ of each agent is as follows:

$$L_i(\theta) = E\left[\left(y^{DQN} - Q_k(s_t, a_t; \theta)\right)^2\right]$$

where $\theta$ indicates the weight of an online network; and $y^{DQN}$ is calculated by the following formula:

$$y^{DQN} = r_{t+1} + \gamma \max_{a'_i \in A} Q_i(s', a'_i; \theta^-),$$

where $a_i'$ indicates an action that maximizes the Q-value of the target network in the status s', and $\theta^-$ indicates the weight.

S27: The training samples in the experience replay database are randomly selected to train the local agent preambles allocation model.

In an embodiment, the status is updated after the local agent preambles allocation model is trained for preset times in step S2.

In an embodiment, in step S2, each agent uses s-greedy strategies to select an action $a_i$, selects an action strategy in the action space A with the probability of an exploration factor ε, and selects an optimal action strategy in the action space A with the probability of (1−ε).

Figure 4:
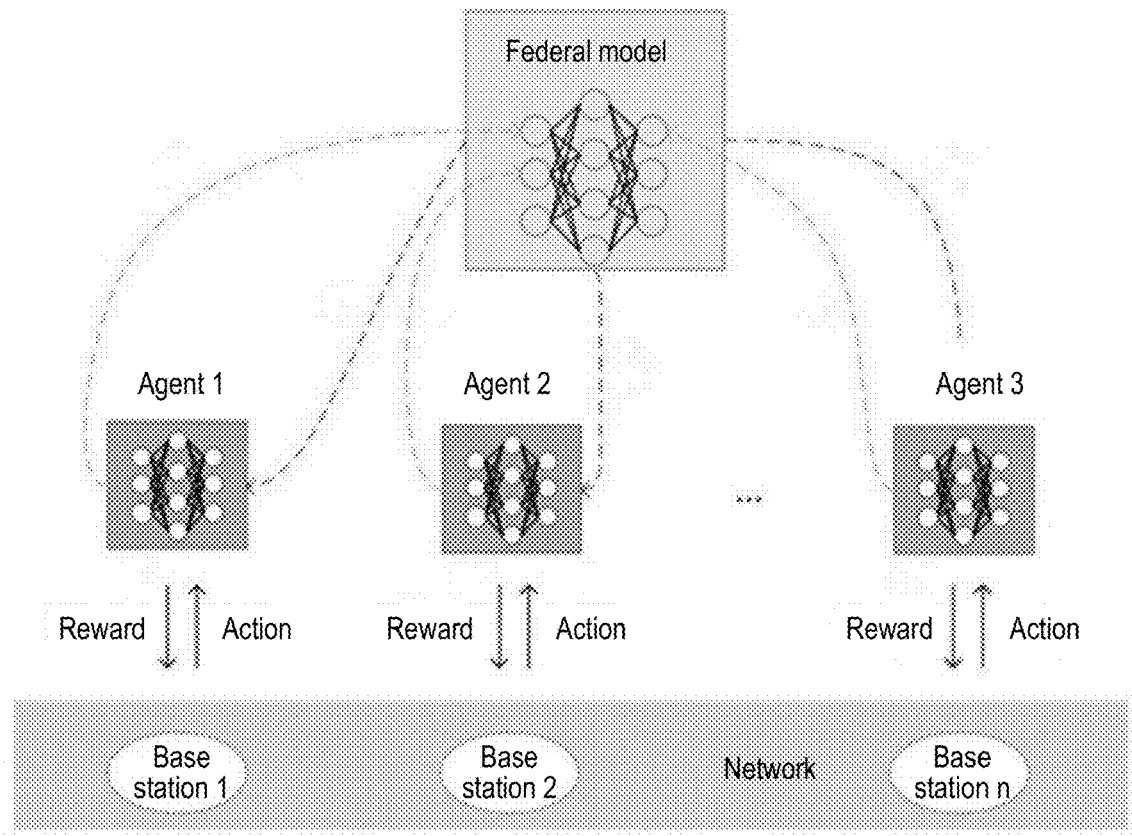
FIG. 4 is a diagram of a federal training model according to an embodiment of the present disclosure.

S3. A global agent preambles allocation model is established based on the local agent preambles allocation model corresponding to each agent and a federal agent, and is then trained by means of a federal learning method, to obtain a trained global agent preambles allocation model. Preambles allocation to each agent that accesses the network is completed by applying the global agent preambles allocation model, where a federal training model is shown in FIG. 4.

Because each individual agent in a multi-agent system faces a different task or situation, the training samples stored in the experience replay database cannot adapt to the changes. Therefore, by using a federal training method, the neural networks of the agent are synchronously optimized by means of average optimization of neural network gradients. In such a federal training method, each agent optimizes its own neural network by using the local experience and the neural network gradients of other collaborative agent. Designing a federal agent aims to collect various local gradients of the involved agent and to perform average optimization. Such a federal agent has a neural network structure same as other agent, but does not take any action.

In step S3, specific steps of training the global agent preambles allocation model based on the federal learning method are as follows:

S31: All the agent choose an action strategy according to a current status and acquire a corresponding reward.

S32: Each agent inputs the current status into a deep neural network in its own local agent preambles allocation model for learning, to obtain parameters of each local agent preambles allocation model; and sends the parameters to the federal agent.

S33: The federal agent learns the parameters of each local agent preambles allocation model by means of a federated average algorithm, to obtain a global agent preambles allocation model, where parameters of the global agent preambles allocation model are as follows:

$$\theta_g = \sum_{k=1}^{N} \frac{D_k}{D} \theta_l,$$

where $\theta_g$ is the weight of the global agent preambles allocation model, $\theta_l$ is the weight of the local agent preambles allocation model, D is the amount of training data, and $D_k$ indicates the amount of data possessed by the k-th participant.

Advantageous effects: Compared to the prior art, the present disclosure has the following advantages:

(1) Unlike the conventional competitive preambles allocation approach, non-competitive queued access can solve the collision problem and enable access of more agent under the same conditions.

(2) During decision making by the agent in the present disclosure, appropriate preambles can be collaboratively selected by means of a multi-agent reinforcement learning algorithm. By using this learning algorithm, the agent can better adapt to environmental changes to make optimal decisions.

(3) Training by means of federal learning can improve the performance of reinforcement learning, thus obtaining a more robust model by training.

The embodiments of the present disclosure are described in detail above with reference to the accompanying drawings, but the present disclosure is not limited to the above-mentioned embodiments. Various changes may also be made within the scope of knowledge possessed by those of ordinary skill in the art without departing from the spirit of the present disclosure.

What is claimed is:

1. A multi-base station queued preambles allocation method based on collaboration between multiple agents, wherein a target area includes a network composed of at least two base stations and each base station includes a preambles pool; and for each agent that accesses the network, the following steps S1 to S3 are performed to complete preambles allocation to each agent; the method comprising:

S1. grouping the agent that accesses the network according to a service type of each agent, calculating an average delay tolerance for each group of agent, and arranging the average delay tolerances of all the groups of agent in an ascending order, to obtain a priority set;

S2. for each group of agent, conducting preambles allocation to each agent in each group based on a reinforcement learning algorithm;

wherein each preamble corresponds to a queue, wherein a status space S is established based on a maximum queuing number in each queue and an action space A is established based on an action of the agent selecting a preamble for queuing, wherein with the status space S as an input, by means of a deep neural network and a Q-learning method, the agent selects an action executable in the action space A by the agent based on a greedy strategy and with a goal of benefit maximization, and wherein with a Q-value of the action executable by the agent as an output, a local agent preambles allocation model is established; and S3. establishing a global agent preambles allocation model based on the local agent preambles allocation model corresponding to each agent and a federal agent, and training the global agent preambles allocation model by means of a federal learning method, to obtain a trained global agent preambles allocation model; and completing preambles allocation to each agent that accesses the network by applying the global agent preambles allocation model.

2. The multi-base station queued preambles allocation method based on collaboration between multiple agents of claim 1, wherein specific steps in step S1 are as follows:

S11: according to a delay requirement for the service of each agent, calculating a degree of service similarity between the agents by the following formula:

$$c(i, j) = e^{-\frac{(t_i - t_j)^2}{2\sigma^2}},$$

wherein c(i,j) is a degree of similarity between services i and j, $t_i$ is a delay requirement for the service i, $t_j$ is a delay requirement for the service j, and σ is a similarity coefficient and 0≤c(i,j)≤1; and according to the degree of service similarity between the agent, taking services of the agent that have a similarity difference less than a preset value as services of the same type and grouping the corresponding agent into the same group;

S12: for each group of agent, calculating the average delay tolerance by the following formula:

$$\bar{t}_k = \frac{\sum_{i=1}^{N_k} t_i}{N_k},$$

wherein $N_k$ indicates a number of agent in the k-th group, and $\bar{t}_k$ indicates an average delay tolerance of the k-th agent group; and S13: respectively calculating an average delay tolerance of each group of agent, denoted as $\{\bar{t}_1, \bar{t}_2, \bar{t}_3, \ldots, \bar{t}_n\}$, wherein n is a number of the agent groups; and then arranging the calculated average delay tolerances of these agent groups in an ascending order and assigning the level of priority thereto successively, wherein the priority order is assigning a highest level of priority to an agent group with a minimum average delay tolerance and a lowest level of priority to an agent group with a maximum average delay tolerance, to obtain the priority set consisting of the levels of priority of these agent groups.

3. The multi-base station queued preambles allocation method based on collaboration between multiple agents of claim 2, wherein specific steps of step S2 are as follows:

S21: with each preamble corresponding to the queue, establishing a status as the following equation based on the maximum queuing number in each queue at the time t:

$$s_t = \{p^1, p^2, \ldots, p^i, \ldots, p^M\},$$

wherein $s_t$ is a status at the time t, $p^i$ is the maximum queuing number in the i-th queue, $i \in \{1, 2, \ldots, M\}$, and M is a total number of the queues;

establishing the status space S from an initial time to the time t as the following equation:

$$S = \{s_0, s_1, \ldots, s_t\},$$

wherein $s_0, s_1, \ldots, s_t$ indicate statuses from the initial time to the time t, and $s_0$ is a status at the initial time;

S22: when accessing the network, the agent selecting one of queues corresponding to the M preamble sand queuing up therein, and establishing the action space A as the following equation based on the action of the agent selecting a preamble for queueing:

$$A = \{a^1, a^2, \ldots, a^i, \ldots, a^M\},$$

wherein $a^i$ indicates an action strategy of the agent, namely, an action of selecting the i-th preamble for queuing;

S23: respectively assigning rewards $r^1, r^2 \ldots, r^n$ to action strategies $a^1, a^2 \ldots, a^n$ selected and executed by the agent, and establishing a reward function R as the following equation:

$$R = r^i(r^1, r^2, r^3, \ldots, r^n),$$

by introducing the levels of priority of the agent and the variance of each queue, transforming the reward function R into the following form:

$$r^i(r^1, r^2, \ldots, r^n) = \sum_{i=1}^{n} f^i(a^1, a^2, \ldots, a^n) - \sum_{i=1}^{n} g^i(a^1, a^2, \ldots, a^n),$$

wherein $f^i(a^1, a^2, \ldots, a^n)$ indicates the level of priority of an agent i, and $g^i(a^1, a^2, \ldots, a^n)$ indicates the variance of the queue;

S24: by means of the deep neural network and the Q-learning method, establishing the local agent preambles allocation model, which uses the status space S as the input and Q-values of actions executable by the agent as the output, where each action of the agent in a status $s_t$ corresponds to the Q-value $Q(s_t, a_t)$, $a_t$ being as follows:

$$a_t = \arg\max_{a \in A} Q(s_t, a),$$

wherein a indicates all the executable actions in the status $s_t$;

according to the Q-learning algorithm, updating the Q-value $Q_{k+1}(s_t, a_t)$ at the next time by using the following formula:

$$Q_{k+1}(s_t, a_t) = Q_k(s_t, a_t) + \alpha_k \cdot \left[r_{t+1} + \gamma \cdot \max_{a' \in A} Q_k(s_{t+1}, a') - Q_k(s_t, a_t)\right],$$

wherein $a_k$ and $\gamma$ are respectively a learning rate and a discount factor, $s_{t+1}$ indicates a status at the next time, $r_{t+1}$ indicates a received reward corresponding to an action executable by the agent in the status $s_{t+1}$, a' indicates the action executable by the agent in the status $s_{t+1}$, A is the action space, $Q_k(s_t, a_t)$ indicates a Q-value in the status $s_t$, and $$\max_{a' \in A} Q_k(s_{t+1}, a')$$

indicates a maximum Q-value corresponding to each executable action in the action space A in the status $s_{t+1}$;

S25: updating the status $s_{t+1}$ and the corresponding reward $r_{t+1}$, and establishing training samples $(s_t, a_t, s_{t+1}, r_{t+1})$ and storing them in an experience replay database;

S26: a loss function $L_{i(\theta)}$ of each agent being as follows:

$$L_i(\theta) = E\left[\left(y^{DQN} - Q_k(s_t, a_t; \theta)\right)^2\right],$$

wherein $\theta$ indicates a weight of an online network; and $y^{DQN}$ is calculated by the following formula:

$$y^{DQN} = r_{t+1} + \gamma \max_{a' \in A} Q_i(s', a_i'; \theta^-),$$

wherein $a_i'$ indicates an action that maximizes the Q-value of the target network in the status s', and $\theta^-$ indicates the weight; and S27: randomly selecting the training samples in the experience replay database to train the local agent preambles allocation model.

4. The multi-base station queued preambles allocation method based on collaboration between multiple agents of claim 3, wherein the status is updated after the local agent preambles allocation model is trained for preset times in step S2.

5. The multi-base station queued preambles allocation method based on collaboration between multiple agents of claim 3, wherein in step S2, each agent uses ε-greedy strategies to select an action $a_t$, selects an action strategy in the action space A with the probability of an exploration factor ε, and selects an optimal action strategy in the action space A with the probability of (1-ε).

6. The multi-base station queued preambles allocation method based on collaboration between multiple agents of claim 3, wherein specific steps in step S3 are as follows:

S31: all the agent choosing an action strategy according to a current status and acquiring a corresponding reward;

S32: each agent inputting the current status into the deep neural network in its own local agent preambles allocation model for learning, to obtain parameters of each local agent preambles allocation model; and sending the parameters to the federal agent; and S33: the federal agent learning the parameters of each local agent preambles allocation model by means of a federated average algorithm, to obtain the global agent preambles allocation model, where parameters of the global agent preambles allocation model are as follows:

$$\theta_g = \sum_{k=1}^{N} \frac{D_k}{D} \theta_l,$$

wherein $\theta_g$ is a weight of the global agent preambles allocation model, $\theta_l$ is a weight of the local agent preambles allocation model, D is the amount of training data, and $D_k$ indicates the amount of data possessed by the k-th participant.

* * * * *